United States Patent [19]
Takiguchi

[11] Patent Number: 5,889,804
[45] Date of Patent: Mar. 30, 1999

[54] ARTIFICIAL COLOR-CENTER LIGHT SOURCE

[75] Inventor: Yoshihiro Takiguchi, Room 24, Mezon Koizumi, 6-33, Midori-cho 1-chome, Musashino-shi, Tokyo 180, Japan

[73] Assignees: Japan Science and Technology Corporation; Yoshihiro Takiguchi, both of Japan

[21] Appl. No.: 803,381

[22] Filed: Feb. 20, 1997

[30] Foreign Application Priority Data

Apr. 16, 1996 [JP] Japan .................................. 8-093873

[51] Int. Cl.⁶ .................................................. H01S 3/16
[52] U.S. Cl. ............................................................. 372/42
[58] Field of Search ...................................... 372/42

[56] References Cited

U.S. PATENT DOCUMENTS

| | | | |
|---|---|---|---|
| 4,301,426 | 11/1981 | Schneider | 372/42 |
| 4,638,485 | 1/1987 | Gellermann et al. | 372/42 |
| 4,672,619 | 6/1987 | Luty et al. | 372/42 |
| 4,839,009 | 6/1989 | Pollock et al. | 372/42 |
| 5,581,499 | 12/1996 | Hamamdjian | 365/106 |

*Primary Examiner*—Leon Scott, Jr.
*Attorney, Agent, or Firm*—Lorusso & Loud

[57] ABSTRACT

In a color-center light source, a color center is formed artificially. A predetermined single atom is removed from the surface of a defect-free ionic crystal so as to form a lattice defect. Optical transition of the defect is utilized so that it functions as a light source.

12 Claims, 4 Drawing Sheets

ARTIFICIAL COLOR-CENTER LIGHT SOURCE

BACKGROUND OF THE INVENTION

1. Field of the Invention

The present invention relates to a new light source having an artificially formed color center (hereinafter referred to as an "artificial color-center light source") in which an atom is removed from the surface of an ionic crystal so as to form a defect artificially and to use the same as a color center.

2. Description of the Related Art

A color center laser is a known light source that operates on the basis of random defects formed in an ionic crystal.

A structure in which a single atom is trapped in an optical resonator to provide a light source is disclosed in a paper entitled "Microlaser: A laser with one atom in an optical resonator" reported in a recent Physical Review Letter.

In the light source, a barium atom beam is passed through the resonator and is optically excited so as to function as a gain medium. Statically, a single barium atom is present in the resonator. Therefore, the author of the paper named the apparatus "single atom optical resonator."

Microlight sources developed thus far are of a type that utilizes transition between energy bands of a semiconductor material and/or structure. Especially, semiconductor quantum-well devices utilizing quantum confined structures and like devices have been used.

However, this invention, in which a single lattice defect is formed in a resonator with atomic level accuracy, enables generation of light having a constant wavelength in a more stable manner as compared with conventional light sources. Moreover, the characteristics of the light source are determined by well defined energy levels of the single defect and an interaction between a field of photons and a coupled vacuum state with the resonator. Therefore, this structure facilitates handling of a light source in quantum optics. It is also important that the basic structure of the light source can be constructed through use of a homogeneous material of a single kind.

Of course, since the size of the structure is at the atomic level, in the future, the light source will be usable as a microlight source in optical communication as well as in information transmission of an optical computer. In contrast to conventional light sources which mainly utilize transition between energy bands of a semiconductor material/ structure, the present invention utilizes energy transition between levels that are determined by the characteristics of an atom itself, which is a more basic element. And, in the present invention, due to electrical confinement, the transition probability becomes higher than that in a bulk material.

With recent progress in developing a technique of manipulating a single atom through use of a scanning tunnel microscope (STM), it has become possible to manipulate the spatial position of each individual atom. A paper entitled "Scanning Tunneling Microscope Fabrication of Atomic Scale Memory on a Silicon Surface" (Dehuan Huang, et al., J. J. A. P. 33, 190 (1994)) discloses a technique of arbitrarily removing and inserting silicon atoms that form a crystal structure on a silicon substrate through use of an ultra-high vacuum STM. Through use of this technique, an attempt has been made to reproduce a defect at the atomic level and to provide an atomic-level memory utilizing the presence/ absence of an atom.

FIGS. 1(a) and 1(b) show artificial lattice defects that were formed through use of the conventional STM. In FIGS. 1(a) and 1(b), the images of silicon atoms are shown as white patterns, while the sites from which silicon atoms were removed are depicted by black patterns. FIG. 1(a) shows an image of an atomic plane before removal of atoms, while FIG. 1(b) shows an image of an atomic plane after atoms at locations indicated by black "+" marks in FIG. 1(a) were removed by the STM. These images clearly show that it is possible to remove an atom from any position on a silicon atom plane.

A lattice defect in an ionic crystal (e.g., LiF, NaCl, NaF, KI) is known to exhibit an optical transition property (usually called a "color center") which is represented by a quantum effect in a quantum box. This characteristic has been used in, for example, a color center laser. Application to a color center laser is disclosed in, for example, "Laser Handbook" (Ohm Corporation). Quantum effect of a color center is disclosed in, for example, "Defects in Crystalline Solids" (written by B. Henderson).

A site from which an atom has been removed (i.e., a defect) serves as an energy well formed in the potential of surrounding atoms. Since the size of the well is smaller than the wavelength of an electron, a quantum confinement effect takes place and quantizes energy levels to discrete values; i.e., quantization levels. Especially, when a negative ion is removed from an ionic crystal so that a defect is formed therein, electrons are attracted by a positive charge generated at the defect and are trapped in the vicinity of the defect. When a trapped electron falls to a lower energy level created by the well, the balance energy is radiated in the form of an electromagnetic wave, which is the light emission process of a color center.

As described above, when only negative ions are removed with atomic-level accuracy, quantized energy levels at which electrons are restrained are established, so that stable light having a narrow spectral width can be generated while avoiding the conventional drawback in which a light source has a broad emission spectra due to inhomogeneity of the randomly created defects.

SUMMARY OF THE INVENTION

An object of the present invention is to provide an artificial color-center light source in which an atom is intentionally removed from the surface of an ionic crystal so as to form a defect artificially and to use the same as a color center.

To achieve the above object, the present invention provides an artificial color-center light source in which a predetermined single atom is removed from the surface of a defect-free ionic crystal so as to form a lattice defect, and optical transition at the defect is utilized as a light source.

The present invention also provides an artificial color-center light source in which a predetermined single atom is removed from the surface of a defect-free ionic crystal so as to form a lattice defect, and the lattice defect is confined within an optical resonator so as to provide a laser operation utilizing the single color center.

In a preferred embodiment a multilayer reflection mirror is formed on a semiconductor substrate, a defect-free ionic crystal is grown on the multilayer reflection mirror, a predetermined single atom is removed from the surface of the crystal so as to form a lattice defect that serves as a color center, and a separate multilayer reflection mirror disposed a short distance above the lattice defect so as to form a microresonator that controls the probability of optical transition.

A single defect is preferably present in the single resonator.

Current injection electrodes are preferably provided so as to supply electrons to the formed lattice defect.

Alternatively, an optical excitation structure is provided so as to supply electrons to the artificially formed lattice defect.

In the above-described microresonator with an artificial color-center light source, it is preferred that two or more defects be present in the single resonator, and that the distance between the defects be roughly equal to the spatial width of the wave function of electrons.

Conventionally, in an ionic crystal, a color center (a state of having a light-generatable level) is formed by a lattice defect, and such an ionic crystal is presently used as an F-center laser or a color-center laser that produces light having a wavelength in the range of 1–3 micrometers. During fabrication, a crystal defect is formed through irradiation of the crystal with Gamma rays and, thus, the arrangement of defects is completely random.

According to the present invention, it is possible to remove an atom from an ionic crystal to form a defect artificially through manipulation of a single atom using an apparatus such as an STM, and therefore a light source that utilizes such a single defect as a color center can be obtained.

While lattice defects of a crystal of an ordinary color center laser have heretofore been difficult to control, this invention provide a well-defined light source by formation of lattice defects controlled with atomic level accuracy through use of an STM. Moreover, it is possible to provide an artificial color-center light source utilizing a lattice defect that is based on cavity quantum electrodynamics, which has not been obtainable through use of conventional techniques.

Moreover, a single defect or several properly arranged defects that are fabricated with atomic level accuracy are caused to emit light to thereby provide an ultimately small point light source, or are confined within a resonator so as to provide a highly coherent light source (single mode light source) that has a narrow spectral width as compared with conventional color center lasers that have a wider inhomogeneous spectrum.

DESCRIPTION OF THE PREFERRED EMBODIMENTS

Embodiments of the present invention will now be described in detail.

Figure 1A:
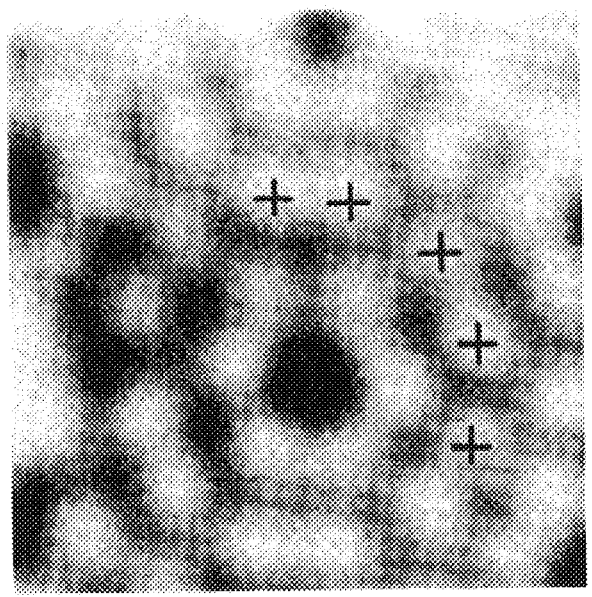
FIGS. 1(a) and (b) are views showing lattice defects artificially formed by an STM.
Figure 1B:
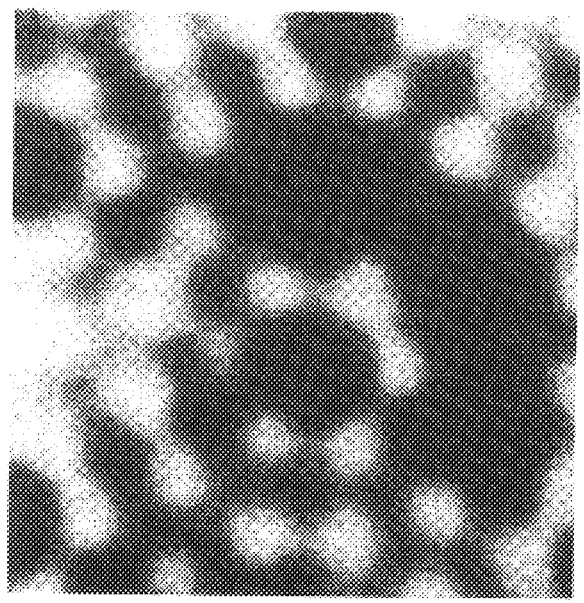
Figure 2:
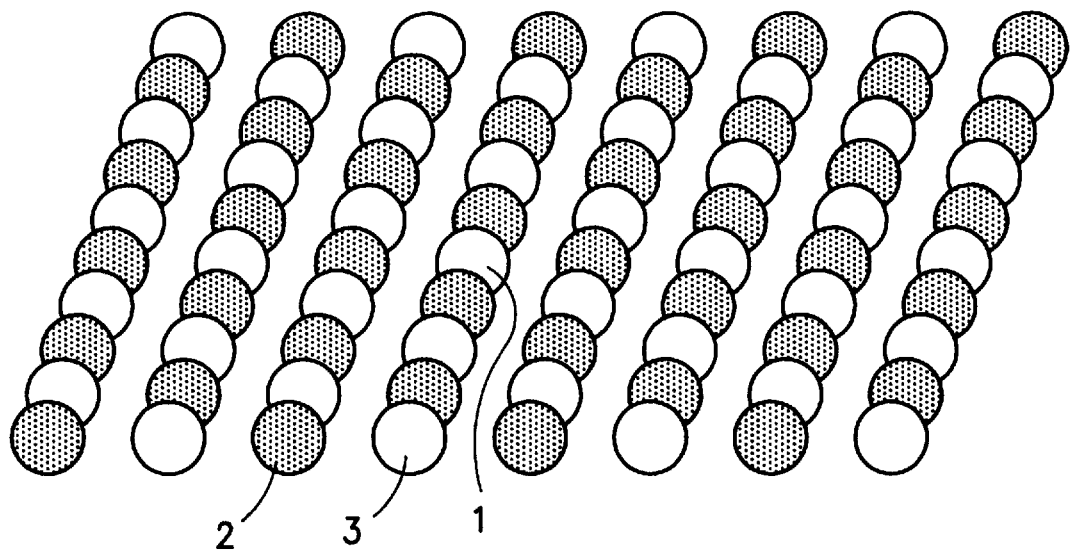
FIG. 2 relates to a first embodiment of the present invention and schematically shows distribution of atoms on a surface from which a single negative ion is removed.
Figure 3:
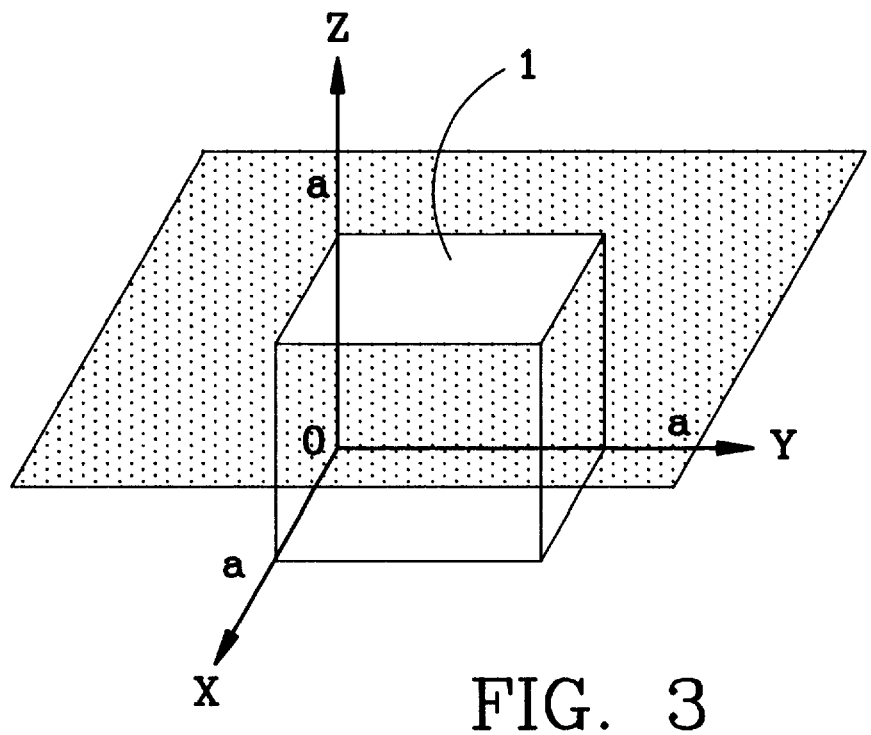
FIG. 3 relates to the first embodiment of the present invention and schematically shows a potential well due to a defect formed by removal of a single negative ion.

FIGS. 2 and 3 show a first embodiment of the present invention; FIG. 2 schematically shows distribution of atoms on a surface from which a single negative ion is removed, while FIG. 3 schematically shows generation of a potential well due to the defect of such single negative iron.

In FIG. 2, a white sphere at the center corresponds to a defect (lattice defect) 1 that was formed by removal of a negative ion and is charged positive. Each of the black spheres corresponds to a positive ion 2, while each of the gray spheres corresponds to a negative ion 3. As described above, removal of the negative ion 3 forms an area that is charged positive. When the energy state of an electron is considered, the positively charged area has a band structure different from that of an ordinary bulk material and has quantized energy levels.

This single lattice defect can be formed through use of an STM. Through application of positive or negative voltage pulse of a proper amplitude to a probe of the STM, any ion can be removed.

In FIG. 2, only a surface layer of ionic crystal is depicted. However, in actuality, the ionic crystal structure continues under the surface layer.

The single defect created in the above-described manner forms a potential well as shown in FIG. 3. Although a Gaussian type potential many be appropriate for approximation, the well is approximated as having a cube-like shape so as to facilitate analysis. In this approximation, the effective mass of electrons may be larger than the actual value, and the lattice constant (a) may be greater than the actual distance between ions.

The wave function of an electron within the well can be determined by solving a Schrödinger equation under the boundary condition that the wave function becomes zero at the end surface of the quantum box. At the same time, quantized energy levels can be determined. The energy levels are expressed as follows:

$$E_{l,m,n} = h^2(l^2+m^2+n^2)/8m^*a^2 \qquad (1)$$

wherein l, n, and m are quantum numbers, and h is Planck's constant. The m* is the effective mass of electrons. The effective mass in the vicinity of a lattice defect is considered to be different from the effective mass in the bulk. (a) is the length of a side of the quantum box.

From Equation (1) representing the energy eigenstates, it is possible to determine the transition energy from a ground state in which l=m=n=1 to a degenerated excited state in which l=2, n=m=1. The thus-determined transition energy is expressed as follows:

$$E_F = 3h^2/8m^*a^2. \qquad (2)$$

Equation (2) is highly consistent with the results of a study conducted by Dawson in which m* is set to approximately 0.7 me (me: free electron mass) in consideration of the relationship between the transition energy and lattice constant of various ionic crystals.

When a certain emission wavelength is required, the corresponding lattice constant can be determined from Equation (2) and thus, it becomes possible to obtain the desired wavelength by finding an ionic crystal having the thus-determined lattice constant.

Next, a second embodiment of the present invention will be described.

In the second embodiment, after a necessary crystal is selected and an artificial defect is formed, the crystal is confined within a microcavity so as to obtain a light source that oscillates in a single mode.

Figure 4:
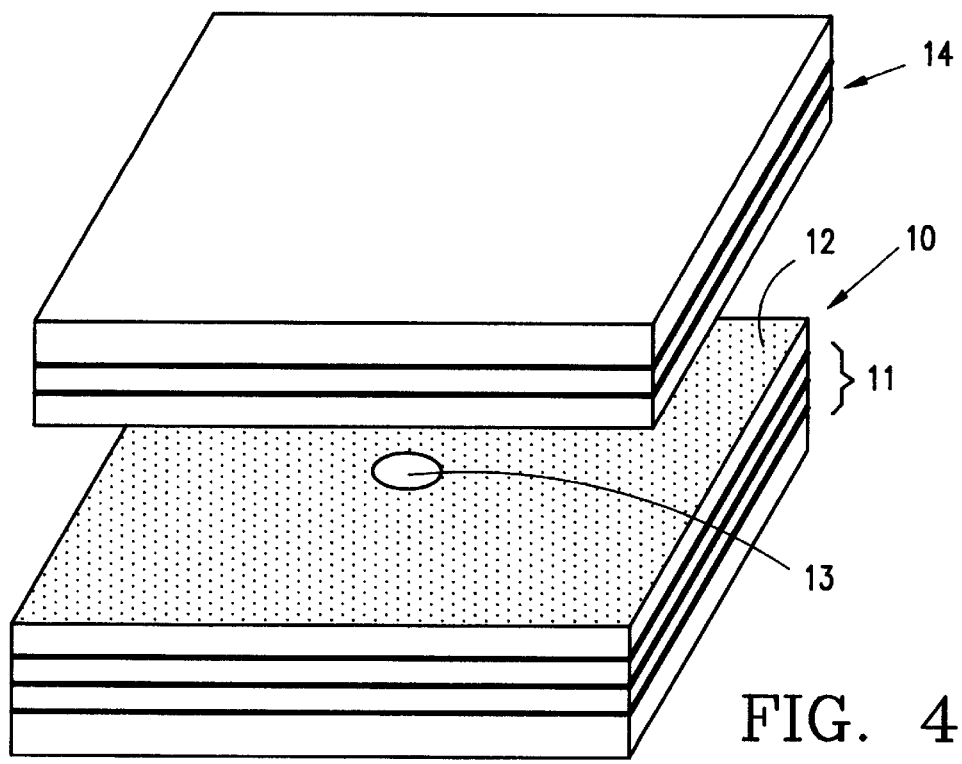
FIG. 4 relates to a second embodiment of the present invention and shows a perspective view of a device in which a plane having a single lattice defect is sandwiched between multilayer mirrors to form a microresonator.

FIG. 4 shows a perspective view of a device according to the second embodiment, in which a plane having a single lattice defect is sandwiched between multilayer mirrors to form a resonator cavity.

As shown in FIG. 4, a reflection mirror 11 having a layered film structure is formed on a suitable substrate 10, and an atomic film 12 of a crystal selected as described above is subsequently grown on the mirror 11. At this time, the temperature of the substrate 10 is elevated so as to eliminate naturally generated defects. Subsequently, a negative ion is removed from the center of the surface of the crystal by an STM. As result, electrons produced at the surface are trapped by a Coulomb field of the lattice defect 13 and are restrained at the defect level.

A semi-transparent multilayer reflection mirror 14 whose transmission characteristic is properly selected is spaced a short distance above the lattice defect 13, to thereby form a microcavity. When the resonator separation of the microcavity becomes equal to a wavelength corresponding to the energy of transition between the ground and the excited states of the defect level, or when the length of the microcavity becomes n times such a wavelength (n is an integer), coupling in the respective mode occurs, so that the device exhibits luminous characteristics in a selected mode. Namely, light is generated at the energy expressed by equation (2).

When the energy level is determined for the case where lattice defects are present in close proximity to each other at the atomic level, it is necessary to calculate band structure, taking into consideration the structure of a crystal itself. When the lattice defects are spaced from each other by a distance (~100 Å) corresponding to the wavelength of an electron, it is considered that coupling of energy levels among the defects occurs because of the effect of electrons that move between the energy levels due to the tunnel effect. Therefore, if the film 12 having a lattice defect is disposed within a proper resonator, there can be obtained an operation in which quantum beat is generated due to matching to the mode of the resonator.

Next, a third embodiment of the present invention will be described with reference to FIG. 5.

Figure 5:
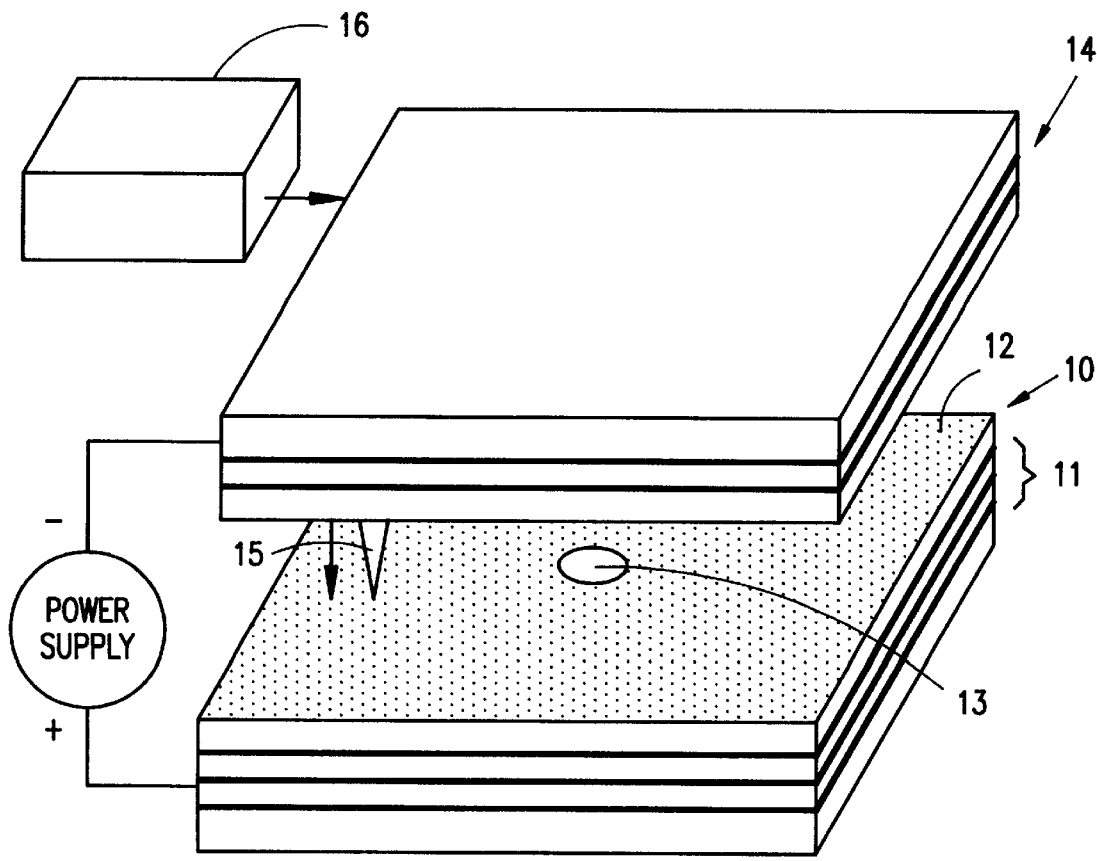
FIG. 5 relates to a third embodiment of the present invention and schematically shows the structure of an artificial color-center light source having a semi-transparent multilayer mirror provided with electrodes which inject electrons into the surface.

FIG. 5 schematically shows the structure of an artificial color-center light source according to the third embodiment, which has a semi-transparent multilayer mirror provided with an electric field generating electrode.

An electrical method or optical method can be used to supply electrons into the interior of the structure. In place of a method in which electrons are supplied through use of a p-n junction as in an ordinary semiconductor, the method as shown in FIG. 5 can be used as an electrical method. That is, a conical electrode 15 that serves as an electric field electron emission electrode is formed on the semi-transparent multilayer mirror 14, and a voltage is applied between the semi-transparent multilayer mirror 14 and the substrate 10 so as move electrons to the crystal surface having a defect.

Since the time required for an electron that has reached to the crystal surface to be trapped by the lattice defect 13 depends on the relative positions of the conical electrode 15 and the lattice defect 13, the distance between the conical electrode 15 and the lattice defect 13 must be minimized so as to obtain a strong light source. In order to change the position of the conical electrode 15 relative to the lattice defect 13, an electrode position changing mechanism 16 composed of a piezoelectric element or like element is attached to the semi-transparent multilayer mirror 14.

Meanwhile, in order to achieve optical excitation, light having an energy greater than the excited level of the lattice defect 13 is irradiated onto the area of the lattice defect 13.

For this purpose, light passing through a transmission area of the semi-transparent multilayer mirror 14 is utilized.

As described above, the artificial color-center light source of the present invention is an ultra-micro light source at the level of a single atom. Therefore, the artificial color-center light source can be used in, for example, optical communication, optical interconnection, and optical computers, in which fields attempts have been made to decrease the size of light sources.

Moreover, since the size of the light source is very small (roughly corresponding to the Bohr radius of a restrained electron; i.e., ~100 Å), the light source of the present invention can be applied to, for example, a field in which spatial coherence is required (Fourier optics).

When such a micro energy source is disposed near an evanescent light field, it becomes possible to convert the energy of the evanescent field to the energy of transmission light. Therefore, it becomes possible to use such a device as an optical detector.

The present invention is not limited to the above-described embodiments. Numerous modifications and variations of the present invention are possible in light of the spirit of the invention, and they are not excluded from the scope of the present invention.

What is claimed is:

1. An artificial color-center light source comprising:

a semiconductor substrate;

a first multilayer reflection mirror superimposed on said semiconductor substrate;

an ionic crystal film superimposed on said first multilayer reflection mirror to provide an ionic crystal film surface, said ionic crystal film having at least first and second lattice defects, each of said first and second lattice defects being a potential well formed by removal of a single negative atomic ion from said surface of said ionic crystal film, said first and second lattice defects being spaced by a distance roughly equal to a spatial width of the wave functions of an electron;

a second multilayer reflection mirror spaced a distance d from said surface of said ionic crystal film to define a microcavity therebetween; and means for supplying electrons to said lattice defects at said surface of said ionic crystal film, whereby said lattice defects trap the supplied electrons and emit light.

2. An artificial color-center light source according to claim 1 wherein said means for supplying electrons is a power source imposing a voltage between said semiconductor substrate and said second multi-layer mirror.

3. An artificial color-center light source according to claim 1 wherein said distance d is equal to a wavelength corresponding to energy of transition between ground and an excited state of the lattice defect or a multiple thereof.

4. An artificial color-center light source according to claim 1 wherein said means for supplying electrons is an injection electrode.

5. An artificial color-center light source according to claim 4 wherein said injection electrode is a conical electrode having a base fixed to said second multi-layer reflection mirror.

6. An artificial color-center light source according to claim 4 further comprising positioning means connected to said second multi-layer mirror for changing the position of said electrode relative to said lattice defect.

7. An artificial color-center light source according to claim 1 wherein said first and second multi-layer mirrors are semi-transparent.

8. An artificial color-center light source comprising:

a semiconductor substrate;

a first multilayer reflection mirror superimposed on said semiconductor substrate;

an ionic crystal film superimposed on said first multilayer reflection mirror and presenting a surface, said ionic crystal film having a single lattice defect in the form of a potential well formed by removal of a single negative atomic ion from said surface of said ionic crystal film;

a second multilayer reflection mirror spaced a distance d from said surface of said ionic crystal film to define a microcavity therebetween; and a power source and a single injection electrode, depending from said second multilayer reflection mirror, for supplying electrons from said power source to said lattice defect.

9. An artificial color-center light source according to claim 8 wherein said single injection electrode is a conical electrode having a base affixed to said second multilayer reflection mirror.

10. An artificial color-center light source according to claim 8 wherein said distance d is equal to a wavelength corresponding to energy of transition between ground and an excited state of the lattice defect or a multiple thereof.

11. An artificial color-center light source according to claim 8 further comprising positioning means connected to said second multi-layer mirror for changing the position of said electrode relative to said lattice defect.

12. An artificial color-center light source according to claim 8 wherein said first and second multi-layer mirrors are semi-transparent.

* * * * *

UNITED STATES PATENT AND TRADEMARK OFFICE
CERTIFICATE OF CORRECTION

PATENT NO. : 5,889,804
DATED : March 30, 1999
INVENTOR(S) : Yoshihiro TAKIGUCHI

It is certified that error appears in the above-indentified patent and that said Letters Patent is hereby corrected as shown below:

Col. 1, line 21, "Statically" should read --Statistically--.

Col. 3, line 27, delete "provide" insert --provides--.

Col. 5, line 55, after "as" insert --to--.

Signed and Sealed this

Fifth Day of September, 2000

Attest:

Q. TODD DICKINSON

*Attesting Officer*     *Director of Patents and Trademarks*